(12) United States Patent
Ebihara

(10) Patent No.: US 9,765,846 B2
(45) Date of Patent: Sep. 19, 2017

(54) POSITIONING APPARATUS MOUNTED WITH VIBRATION ISOLATORS AND ROBOT

(71) Applicant: FANUC Corporation, Yamanashi (JP)

(72) Inventor: Kenzo Ebihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/919,998

(22) Filed: Oct. 22, 2015

(65) Prior Publication Data

US 2016/0116017 A1   Apr. 28, 2016

(30) Foreign Application Priority Data

Oct. 23, 2014 (JP) .................................. 2014-216650

(51) Int. Cl.

| F16F 15/02 | (2006.01) |
|---|---|
| F16M 11/22 | (2006.01) |
| F16M 7/00 | (2006.01) |
| F16M 11/04 | (2006.01) |
| F16M 11/12 | (2006.01) |
| F16M 11/18 | (2006.01) |
| F16G 11/10 | (2006.01) |

(52) U.S. Cl.
CPC ............ *F16F 15/02* (2013.01); *F16G 11/103* (2013.01); *F16M 7/00* (2013.01); *F16M 11/04* (2013.01); *F16M 11/12* (2013.01); *F16M 11/18* (2013.01); *F16M 11/22* (2013.01); *F16M 2200/04* (2013.01)

(58) Field of Classification Search
CPC ........... F16F 15/02; F16M 7/00; F16M 11/04; F16M 11/12; F16M 11/18; F16M 11/22; F16M 2200/04

USPC .......................................................... 700/280
See application file for complete search history.

(56) References Cited

U.S. PATENT DOCUMENTS

| 5,285,995 A * | 2/1994 | Gonzalez ............... G05D 19/02 248/550 |
|---|---|---|
| 5,342,161 A | 8/1994 | Shimoichi et al. |
| 5,802,966 A * | 9/1998 | Schoch ............... B30B 15/0076 100/214 |

(Continued)

FOREIGN PATENT DOCUMENTS

| EP | 0987087 A2 | 3/2000 |
|---|---|---|
| JP | 56-166127 U | 12/1981 |

(Continued)

OTHER PUBLICATIONS

Epson, G1 Series Robot Manual (Rev. 7), Feb. 2015, Rev 7, pp. 14-22, 27. (see also, Epson Robot Manuals.pdf for publication date) retrieved from Robots.Epson.com Oct. 3, 2016.*

(Continued)

*Primary Examiner* — Mohammad Ali
*Assistant Examiner* — Joshua Sanders
(74) *Attorney, Agent, or Firm* — Hauptman Ham, LLP

(57) ABSTRACT

A positioning apparatus mounted with at least one linear axis or axis of rotation and a robot on a base and mounted with vibration isolators and the robot includes vibration isolators that are capable of seating and suspending the base and a controller that controls suspension and seating of the vibration isolators in accordance with an operating condition of the robot.

5 Claims, 10 Drawing Sheets

(56) References Cited

U.S. PATENT DOCUMENTS

| | | | | |
|---|---|---|---|---|
| 5,876,012 A | * | 3/1999 | Haga | F16F 15/0275 |
| | | | | 248/550 |
| 6,092,004 A | * | 7/2000 | Harima | G05B 19/4103 |
| | | | | 318/568.15 |
| 6,123,312 A | * | 9/2000 | Dai | F16F 9/53 |
| | | | | 188/378 |
| 2009/0218473 A1 | | 9/2009 | Hamann et al. | |

FOREIGN PATENT DOCUMENTS

| | | |
|---|---|---|
| JP | 62-120926 A | 6/1987 |
| JP | 5-084431 U | 11/1993 |
| JP | 2000-94245 A | 4/2000 |
| JP | 2007-155038 A | 6/2007 |
| JP | 2007-534509 A | 11/2007 |

OTHER PUBLICATIONS

Epson, EPSON RC+ 5.0 User's Guide, 2011, Seiko Epson Corporation, Ver. 5.4, p. 33, full document available from: www.d.umn.edu/~rlindek1/ME4135_11/e_EPSONRC%2BUsersGuide54_r1.pdf retreived May 11, 2017.*

Office Action in JP Application No. 2014-216650, mailed Mar. 7, 2017.

* cited by examiner

POSITIONING APPARATUS MOUNTED WITH VIBRATION ISOLATORS AND ROBOT

RELATED APPLICATIONS

The present application claims priority to Japanese Application Number 2014-216650, filed Oct. 23, 2014, the disclosure of which is hereby incorporated by reference herein in its entirety.

BACKGROUND OF THE INVENTION

1. Field of the Invention

The present invention relates to a positioning apparatus and particularly relates to a positioning apparatus mounted with vibration isolators and a robot.

2. Description of the Related Art

In such a positioning apparatus as a machine tool and a measurement apparatus, floor vibrations at an installation site may influence machining, measured results, or the like. In a machine tool, a measurement apparatus, or the like that requires particularly precision position control, it is common to provide a structure that does not propagate the floor vibrations, by mounting of vibration isolators. It is difficult for simple vibration isolators with use of anti-vibration rubber to isolate vibrations with low frequency (50 Hz or lower), and thus an air damper that causes suspension with use of pneumatic pressure, a magnet damper that causes suspension with use of magnetic force, or the like is used in a vibration isolator with high accuracy. Japanese Patent Application Laid-Open No. 2007-155038 discloses a vibration control device in which air actuators and sensors are unitized.

FIGS. 11 and 12 illustrate configurations of prior art techniques. In FIG. 11, a robot requires a long distance for attachment and detachment of a work, because the robot is installed on a floor, and thus a large robot 90 is required as the robot. In order to prevent deviation in relative position with respect to the large robot 90 for automation of work replacement by the robot, a lathe 91 is mounted with no vibration isolators and a base 92 integrated with leg parts is used with the lathe 91. In absence of the vibration isolators, precision machining cannot be carried out due to reception of influence of the floor vibrations.

In FIG. 12, vibration isolators 10 for a precision lathe 1 isolate the floor vibrations while always keeping a suspended state. Relative position between the large robot 90 which is installed on a floor and which carries out attachment and detachment of a work and a vacuum chuck face to which the work is to be attached undergoes deviation that is caused by the vibration isolators. In order to correct amount of the deviation, an image is captured by a CCD camera 93, mounted on the robot, before attachment of the work and the amount of the deviation in the position is calculated by comparison with a reference image stored in a controller for the robot and is fed back for position of the robot. It is thus necessary to separately mount sensors such as the CCD camera 93 and to provide a device and software that feed back information from the sensors for correction of the position of the robot.

In general, vibration isolators are intended for isolating floor vibrations and are not required to keep strictly the same posture. Accordingly, a machine tool or a measurement apparatus does not always have the same posture and position when viewed from a floor as a static system. In case where the posture of the machine tool or the measurement apparatus, that is, an inclination of the machine tool or the measurement apparatus is changed in some degree, the machine tool or the measurement apparatus itself receives no influence in accuracy, as long as sufficient machine rigidity is provided, and there is no problem in use of the machine tool or the measurement apparatus alone.

Considering use in combination with a robot for automation, on the other hand, coordinates on the machine as viewed from the robot fixed to the floor deviate due to intervention of the vibration isolators.

Therefore, the positional deviation is required to be corrected on condition that the robot carries out attachment and detachment of a tool or a work on the machine.

Correction of the positional deviation can be carried out by correction of hand position of the robot with mounting of separate sensors such as camera and measurement of the amount of the positional deviation. This method, however, requires the separate sensors and a device or software that feeds back the amount of the deviation to the robot.

As another solution, the influence of the positional deviation caused by the vibration isolators can be cancelled by mounting of the robot on the machine, that is, above the vibration isolators. This solution obviates necessity of addition of devices such as the sensors. The mounting on the machine shortens distance from the robot to the tool or the work, thus allows employment of the robot having a smaller size, and contributes to reduction in installation area and costs.

On condition that the robot fixed to the floor is operated at high speed, reactions thereto are exerted only onto the floor and thus little or no influence is exercised on the accuracy of the machine tool or the measurement apparatus. On condition that the robot is mounted on the machine as described above, by contrast, the reactions to high-speed operation of the robot are directly conveyed to the machine tool or the measurement apparatus. In particular, the machine tool or the measurement apparatus that has high precision is suspended through agency of the vibration isolators and is thus shaken greatly when subjected to a strong reaction. Great disturbance is not assumed for the machine tool and the measurement apparatus that have high precision and thus great shaking of the machine tool or the measurement apparatus makes it impossible to hold a position thereof by servo motors and triggers an alarm.

SUMMARY OF THE INVENTION

An object of the invention is to provide a positioning apparatus which is mounted with at least a linear axis or an axis of rotation and a robot on a base, which is mounted with vibration isolators and the robot, and in which an operating condition of the robot exerts no influence on operations of the linear axis or the axis of rotation, in consideration of problems of the prior art techniques.

The positioning apparatus mounted with the vibration isolators and the robot according to the invention is mounted with at least one linear axis or axis of rotation and the robot on the base and includes the vibration isolators that are capable of seating and suspending the base and a controller that controls suspension and seating of the vibration isolators in accordance with an operating condition of the robot.

An effect of the positioning apparatus mounted with the vibration isolators and the robot is as follows.

Though change in posture caused by the vibration isolators under a condition that the robot is installed on a floor may be a cause of the positional deviation between the robot and the axes of the positioning apparatus, installation of the robot on the base prevents the change in the posture caused by the vibration isolators from influencing the relative position between the robot and each axis.

When the robot is operated at low speed or stopped, the vibration isolators are suspended so that floor vibrations may not be propagated to the linear axes or the axes of rotation on the base and positioning with high accuracy is thereby carried out.

When the robot is operated at high speed, the vibration isolators are seated so that the base supported by the vibration isolators may not be shaken by reactions. In order to improve cycle time for machining, measurement, or the like by automation by the robot, operation at maximum speed of the robot that carries out attachment and detachment of a tool, a work, or the like is required. Then the machining, the measurement, or the like is completed and thus no influence in accuracy is produced by seating of the vibration isolators. Therefore, a configuration described above attains compatibility between shortening of the cycle time for replacement of the tool, the work, or the like by the robot and increase in the accuracy in the machining, the measurement, or the like by the vibration isolators.

The vibration isolators may have a structure that is suspended with use of pneumatic pressure or electromagnetic force and the controller may control the suspension and the seating at discretion by control signals.

An effect of the positioning apparatus mounted with the vibration isolators and the robot is as follows.

Although mechanical springs or repulsion between permanent magnets can be conceived as a mechanism for the suspension in the vibration isolators, the suspension or the seating by those structures requires a structure mounted with separate actuators for fixation (seating). In the vibration isolators in which the pneumatic pressure or the electromagnetic force (repulsion between an electromagnet and a permanent magnet) is used, by contrast, the suspension/seating can easily be effected with ON/OFF of supplied air or ON/OFF of a power supply.

In the positioning apparatus mounted with the vibration isolators and the robot, a state of the suspension or the seating may be controlled so as to be maintained by the vibration isolators during a series of operations of the robot that are delimited by at least one program, based on comparison between maximum value of instruction speed in the series of operations of the robot and a predetermined threshold.

An effect of the positioning apparatus mounted with the vibration isolators and the robot is as follows.

Operating speed of the robot is not always fixed in an operation program and thus control of the suspension/seating of the vibration isolators based on simple comparison with the threshold leads to frequent switching to the suspension/seating. Such instantaneous switching of the suspension/seating itself makes a great impact on the base and thus time to such an extent that the impact is not produced, for instance, several seconds are required for the suspension/seating. Putting the operation of the robot on standby for that time leads to increase in the cycle time of the robot. In at least one operation program, therefore, the maximum speed in the program is compared with the threshold, the state of the seating or the suspension is effected before execution of the program, and the state is maintained during the execution of the program. Thus the robot stands by for the switching of the suspension/seating only before the execution of the program.

Strictly, it is thought that the reaction exerted on the base is maximized when acceleration of a hand (tool coordinate system), rather than the speed, is maximized and posture of the robot also exerts an influence on the reaction. It is common, however, that the speed is specified on a program and the comparison in magnitude of the speeds is carried out.

The controller may have a function of outputting the control signals at timing specified in the program and may control the suspension or the seating of the vibration isolators by the control signals.

An effect of the positioning apparatus mounted with the vibration isolators and the robot is as follows.

In an automated system with use of a robot, programs for same operations are merely iterated and in which program the vibration isolators are to be suspended or seated does not need to be determined from the speed and can be determined from a purpose of the program. Therefore, a user is capable of integrating, in advance, statements of the control signals that control the suspension/seating of the vibration isolators into the program. For instance, a program that carries out replacement of a work, a tool, or the like on a machine tool, a measurement apparatus, or the like by a robot initially transmits the control signals for the seating to the vibration isolators, thereafter operates the robot at the maximum speed, and thereby carries out an operation of the replacement. Subsequently, the vibration isolators are suspended before machining, measurement, or the like is started and a program that makes the robot prepare a next work, tool, or the like during the machining, the measurement, or the like is operated at low speed.

In a system in which a machine tool, a measurement apparatus, or the like is mounted with a robot, in general, collision avoidance, ensuring of security of a user, and the like are needed and thus operating condition of counterpart can mutually be monitored through real-time communication of information on the operating condition. Therefore, control instructions for the vibration isolators may be integrated into a program for the machine tool, the measurement apparatus, or the like, into a program for the robot, or into both the programs.

Not only the suspension/seating of the vibration isolators may be switched in accordance with the operations of the robot but also the suspension/seating of the vibration isolators may be switched in accordance with operations of the machine tool, the measurement apparatus, or the like. For instance, strong reactions are caused when the axes of the machine tool, the measurement apparatus, or the like are operated at high speeds as with the robot. Accordingly, there may be usage in which the vibration isolators are then seated and in which the vibration isolators are suspended only during precision operations. In such usage for a machine tool, for instance, the vibration isolators can be seated so as to prevent shaking that may be caused by reactions to acceleration and deceleration during roughing that requires high-speed feeding and the vibration isolators can be suspended, during finishing, so as to ensure the finishing with high accuracy with low-speed feeding.

The positioning apparatus mounted with the vibration isolators and the robot may include at least one set of joint members by which position and posture of the base are uniquely determined when the vibration isolators are seated.

An effect of the positioning apparatus mounted with the vibration isolators and the robot is as follows.

A horizontal position of the base on the vibration isolators is not reproduced whether in a suspended state or in a seated state.

In an example in which two positioning apparatuses are installed side by side and in which a robot installed on a base of one of the apparatuses places a work on an adjoining positioning base, for instance, a position where the work is placed deviates unless the positions of the bases of the positioning apparatuses are accurately reproduced. According to a configuration described above, the positions of the bases are uniquely determined by the joint members with the vibration isolators tentatively seated, so that positional deviation between the robot and the adjoining positioning apparatus is prevented.

The invention includes the above configurations and thereby provides the positioning apparatus which is mounted with at least the linear axis or the axis of rotation and the robot on the base, which is mounted with the vibration isolators and the robot, and in which an operating condition of the robot exerts no influence on operation of the linear axis or the axis of rotation.

BRIEF DESCRIPTION OF THE DRAWINGS

The above-mentioned and other objects and features of this invention will become apparent from the following description of the embodiment with reference to the accompanying drawings, in which.

DETAILED DESCRIPTION OF THE PREFERRED EMBODIMENTS

Figure 1:
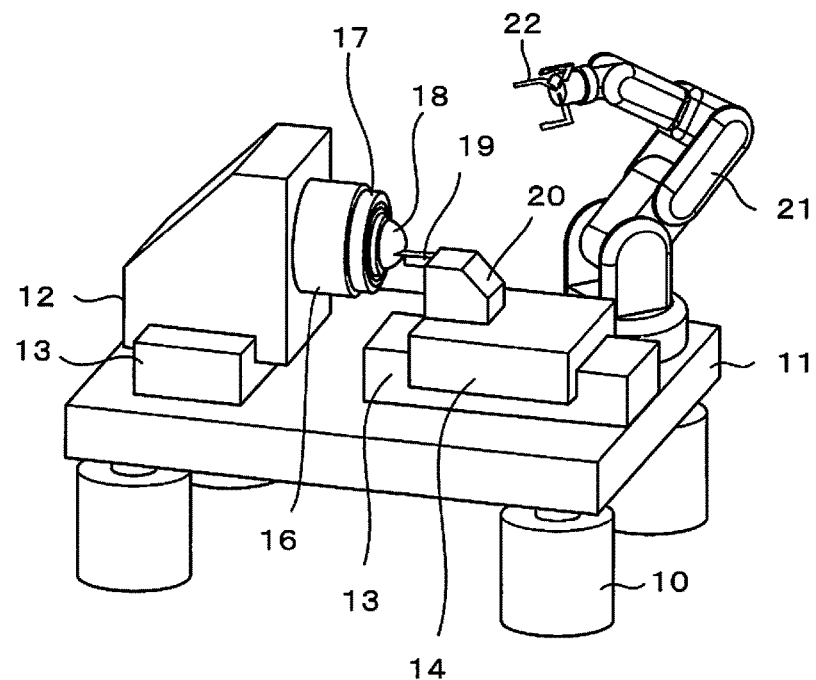
FIG. 1 is a diagram illustrating an embodiment of the invention in which a positioning apparatus is a precision lathe.

Hereinbelow, the same or similar components in embodiments will be described with use of the same reference characters. An outline of the embodiments will be described below. In an air damper, a magnetic damper, or the like, suspension/seating of the damper can be effected at discretion with ON/OFF of air or ON/OFF of an electromagnet. Shaking due to operations of a robot can be minimized by seating of vibration isolators in advance, when the robot is operated at high speed, and by suspension of the vibration isolators in advance, when the robot is stationary or operates at low speed. The robot operates at high speed when a tool, a work, or the like is replaced and then machining, measurement, and the like are not carried out. Therefore, influence of floor vibrations that may occur with the seating of the vibration isolators does not appear. During the machining, the measurement, or the like that requires high positioning accuracy, the suspended vibration isolators isolate the floor vibrations and the operation of the robot is stopped or the robot is operated at low speed. Consequently, influence of the shaking caused by the robot, the vibrations, and the like can be reduced.

FIG. 1 is a diagram illustrating an embodiment of the invention in which a positioning apparatus is a precision lathe. FIG. 1 corresponds to an embodiment according to Claim 1. The positioning apparatus of the embodiment is the precision lathe 1 including the robot. X axis is configured by a guide member 13 that is fixed to a surface of a base 11 and an X-axis slide 12 that is guided by the guide member 13. Z axis is configured by the guide member 13 that is fixed to the surface of the base 11 and a Z-axis slide 14 that is guided by the guide member 13.

A work 18 is attached to a spindle 16 on X axis with a vacuum chuck 17 therebetween, a tool 19 is attached to a tool post 20 on Z axis, and machining is carried out by rotation of the two axes of X and Z and of the spindle. In order that precision machining may be carried out, the base 11 is supported by four vibration isolators 10 so that a structure which isolates the base 11 from the floor vibrations is provided. A robot 21 is mounted on the base 11 for automatic replacement of the work 18 and a hand 22 capable of gripping the work 18 is attached to the robot 21.

In chucking of the work 18 by the vacuum chuck 17, a degree of freedom for attachment exists in directions parallel to a chuck face and thus the attachment needs to be carried out at an exact position such that center of rotation of the spindle 16 coincides with center of the work 18. Though the center of the work 18 can be aligned automatically to some degree with the center of the spindle with use of a three-jaw chuck in place of the vacuum chuck 17, the vacuum chuck is used in machining with high accuracy in order to avoid deformation of the work 18 tightened with three jaws.

Mounting of the robot 21 on the base 11 has a merit in cost in that the robot 21 may be reduced in size all the more because the robot 21 is allowed to have smaller reach for the replacement of the work 18, in comparison with installation of the robot 21 on the floor. Such mounting has another merit in that installation area for a whole system may be reduced all the more because the robot 21 occupies no area on the floor. Furthermore, the vibration isolators 10 often lack reproducibility of position, posture, and the like. Installation of the robot 21 on the base 11, however, ensures that relative coordinates between the robot 21 and the work 18 are uniquely determined upon accurate positioning control over the axes, irrespective of the positions, postures, and the like of the vibration isolators 10. On condition that the vacuum chuck 17 is used, the attachment and detachment of the work with high reproducibility of position is important because exact coincidence between the center of the work 18 and the center of the spindle 16 is required.

Figure 2A:
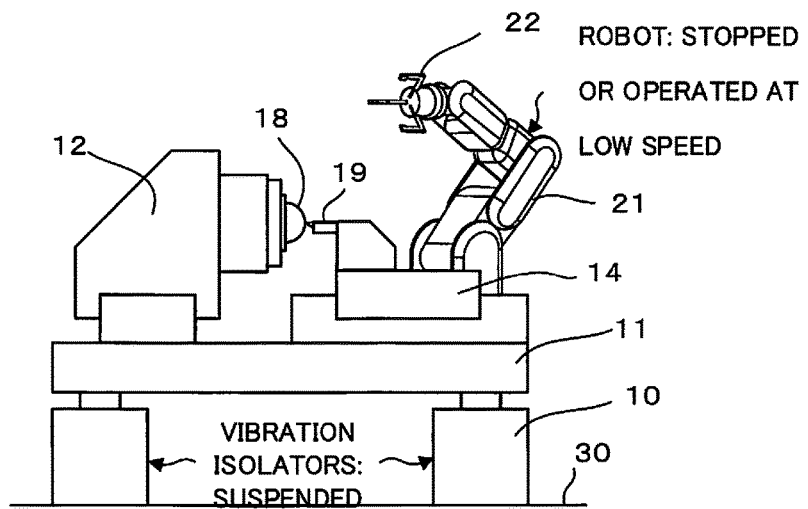
FIG. 2A illustrates a state in which vibration isolators are suspended in FIG. 1
Figure 2B:
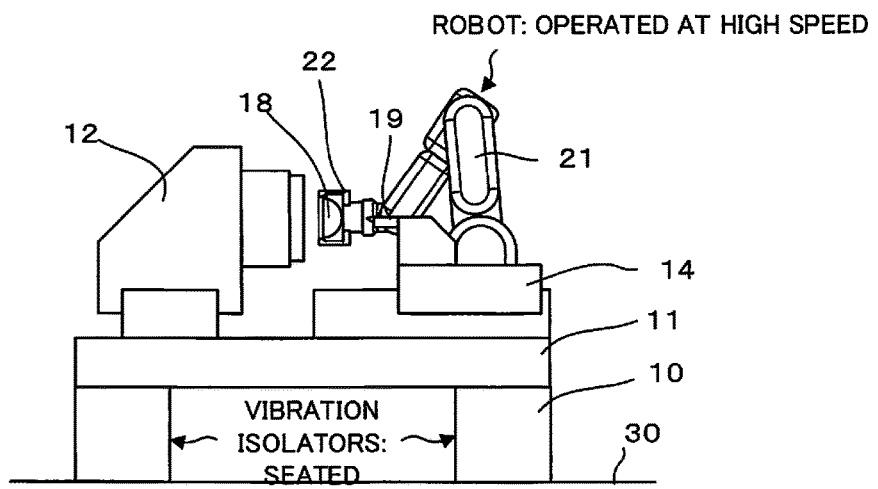
FIG. 2B illustrates a state in which the vibration isolators are seated in FIG. 1.

FIGS. 2A and 2B illustrate a state illustrated in FIG. 2A in which the vibration isolators are suspended and a state illustrated in FIG. 2B in which the vibration isolators are seated, in the embodiment encompassed by Claim 1. A configuration described with reference to FIG. 1 greatly contributes to improvement in accuracy in precision machining in that the vibration isolators 10 isolate the base 11 from the floor vibrations of a floor 30 but has a major defect in that the base 11 is easily shaken when a force is exerted on the base 11 in the state in which the vibration isolators 10 are suspended. In particular, high-speed operation of the robot 21 greatly shakes the base 11 because of a strong reaction exerted on the base 11 and thus makes a great disturbance against the position control over the axes.

In case where the disturbance exceeds thrusts of motors that carry out the position control over the axes, the axes fall into an alarm condition based on excessive error or the like. Conventionally, this has been a major reason why the robot 21 cannot be installed on the vibration isolators 10.

The high-speed operation of the robot 21 in such an automated machining system with use of the robot 21 is required in order to shorten cycle time. The robot 21, however, does not always operate at high speed. The high-speed operation of the robot 21 leads to shortening of the cycle time in a step of the automatic replacement of the work 18 and the robot does not have to operate at high speed during machining. On the other hand, the suspension of the vibration isolators is not required during the automatic replacement of the work but required only during the machining. In this regard, as illustrated in FIGS. 2A and 2B, a distinction can be made between duration of the machining and duration of the work replacement. That is, "vibration isolators: suspended" and "robot: stopped or operated at low speed" can be attained during the machining and "vibration isolators: seated" and "robot: operated at high speed" can be attained during the work replacement.

Though FIGS. 1, 2A, and 2B illustrate the embodiment that is the precision lathe, the invention can be applied to various precision processing machines such as precision machining center and precision polishing apparatus. The robot 21 can be applied not only to the work replacement but also to various automated applications such as tool replacement and washing in the machine that are possible on the machine. A configuration of the embodiment minimizes increase in the installation area due to the installation of the robot 21, allows reduction in the size of the robot 21, and attains compatibility between the machining with high accuracy with use of the vibration isolators and handling at high speed by the robot, in automation of precision processing machines with use of the robot 21.

Figure 3:
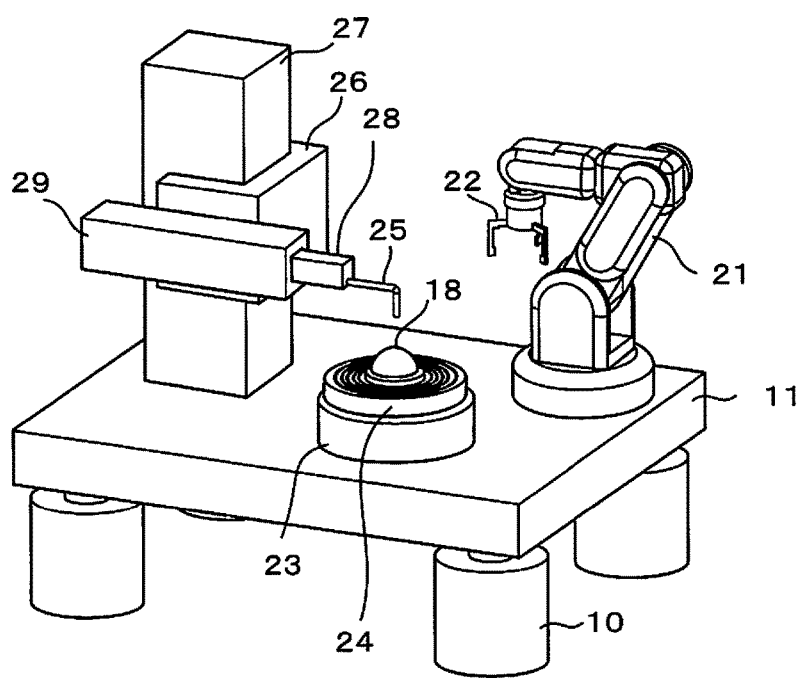
FIG. 3 is a diagram illustrating an embodiment of the invention that is a precision three-dimensional measurement apparatus.

FIG. 3 is a diagram illustrating an embodiment that is a precision three-dimensional measurement apparatus. FIG. 3 illustrates the embodiment which is encompassed by Claim 1 and in which the positioning apparatus is the precision three-dimensional measurement apparatus including the robot. Though the embodiment also has a structure including the base, the robot, and the vibration isolators as with the precision lathe of FIG. 1, Y axis on the base is mounted with Z axis and a shape is measured while a probe attached to an extremity of a Z-axis slide is brought into contact with a work. A rotary table is mounted on the base and the work is fixed thereto through a vacuum chuck.

For control of the suspension or the seating of the vibration isolators, as with description for FIGS. 2A and 2B, a distinction can be made between duration of measurement and the duration of the work replacement and "vibration isolators: suspended" and "robot: stopped or operated at low speed" are attained during the measurement and "vibration isolators: seated" and "robot: operated at high speed" are attained during the work replacement.

FIG. 3 illustrates an example in which the positioning apparatus is the precision three-dimensional measurement apparatus 2. Though FIG. 3 illustrates the embodiment in form of the precision three-dimensional measurement apparatus in which the contact-type probe (probe 25) is used, the invention can be applied to various precision measurement apparatuses such as CCD camera, capacitance displacement gauge, and noncontact measurement apparatus such as laser measuring equipment and white interference measurement apparatus. The robot 21 can be applied not only to the work replacement but also to various automated applications such as probe replacement and air blow that are possible on the measurement apparatus. A configuration of the embodiment minimizes the increase in the installation area due to the robot 21, allows the reduction in the size of the robot 21, and attains compatibility between measurement with high accuracy with use of the vibration isolators 10 and the handling at high speed by the robot 21, in automation of the precision measurement apparatus with use of the robot 21.

Figure 4A:
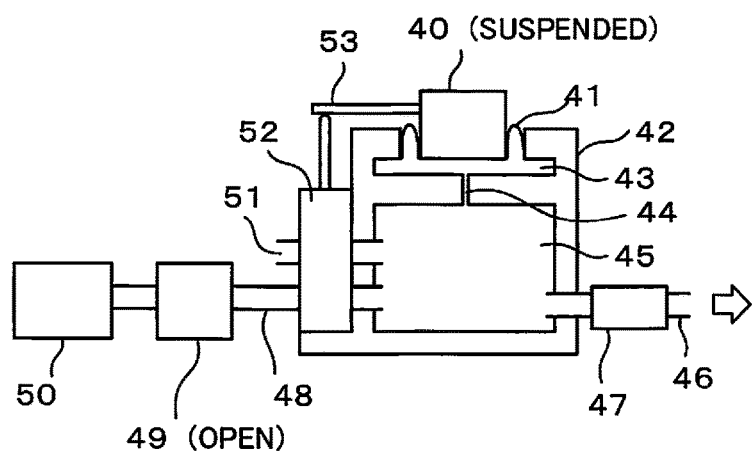
FIGS. 4A and 4B are diagrams illustrating a structure of an air damper for which suspension and seating can be controlled by external signals.
Figure 4B:
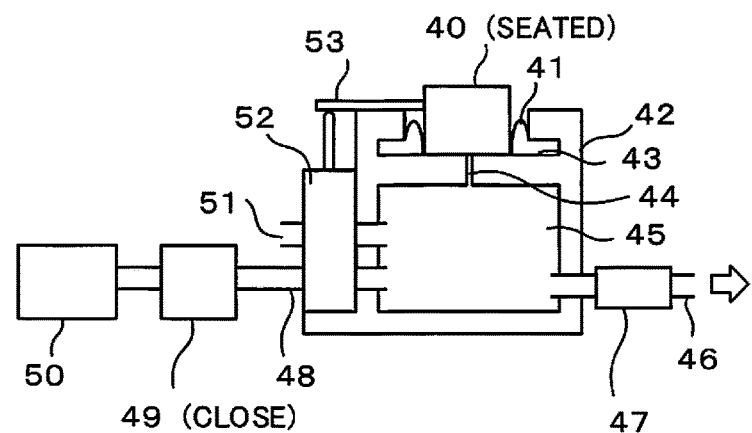

FIGS. 4A and 4B are diagrams illustrating a structure of an air damper for which suspension and seating can be controlled by external signals. FIGS. 4A and 4B illustrate the structure (sections) of the air damper for which the suspension and the seating can be controlled by the external signals, as an embodiment encompassed by Claim 2.

FIG. 4A illustrates a suspended state, in which high-pressure air supplied from a high-pressure air source 50 such as compressor is guided through a solenoid valve 49 (open form) that can be opened and closed by the external signals and a level adjustment device 52 into a first chamber 45 in an air damper body 42. The high-pressure air in the first chamber 45 flows through an orifice (narrow duct) 44 into a second chamber 43. A piston 40 is lifted up and suspended by air pressure because the second chamber 43 is hermetically closed by the piston 40 and a bellows 41. Then the piston 40 is brought into a non-contact state with respect to the floor 30 and thus floor vibrations can be isolated. The orifice 44 has a role of restricting air flow that comes into and goes out of the second chamber 43 and thereby restricts a speed at which the piston 40 moves up and down. Accordingly, the piston 40 is not lifted up by a simple pneumatic spring and the orifice 44 performs functions of a damping mechanism as the air damper.

The level adjustment device 52 is informed of a vertical position of the piston 40 through a reference plate 53 and the position of the piston 40 is automatically adjusted to a reference position by increase by the level adjustment device 52 in amount of air to be supplied into the first chamber 45, when the position of the piston 40 is below the reference, and by decrease in amount of air inflow and increase in amount of air to be discharged from a level adjustment discharge pipe 51, when the position of the piston 40 is above the reference.

On condition that control is carried out by the level adjustment device 52 so that the position of the piston 40 strictly keeps the reference position, however, frequent fluctuation in the amount of air supplied into or discharged from the first chamber 45 causes shaky upward and downward movement of the piston 40 and such movement itself turns into vibrations.

Therefore, the level adjustment device 52 is commonly operated with a dead zone with a certain range provided for deviation of the piston 40 from the reference position. Thus stable suspension is attained in a state in which the level adjustment device 52 provides a flow rate balanced with a flow rate that is discharged from the first chamber 45 through a throttle valve 47 under a condition that there is no major fluctuation in load on the piston 40. The level adjustment device 52 has a role of maintaining the same amount of suspension even if a payload on the base 11 (see FIG. 1) is changed and a role of maintaining a horizontal level to a certain degree against unbalanced load on the base 11 by independent adjustment in the amount of suspension by the four vibration isolators 10.

The dead zone described above for the level adjustment device 52 is a cause of lack of the position reproducibility in the suspended vibration isolators that has been described with reference to FIG. 1. The level adjustment device 52 merely responses to fluctuation in the payload and lacks high-speed responsiveness such that reactions to the high-speed operation of the robot 21 are suppressed (vibration control). Though the air damper of FIGS. 4A and 4B is categorized as a passive damper because the air damper does not actively control the position of the piston 40, there is a type of the vibration isolators 10 that are separately mounted with actuators and that actively control the position of the piston 40. The actuators, however, have limits of responsiveness, generated forces, and the like and are thus incapable of suppressing the reactions to the robot 21.

In common applications of air dampers, the air dampers are not used with switching between the suspension and the seating and a device that carries out the switching between the suspension and the seating by electric signals is not required. In applications in accordance with the embodiment, however, the control to the suspension or the seating by the external signals is carried out with mounting of the solenoid valve 49.

FIG. 4B illustrates a state in which the air damper is seated with the solenoid valve 49 closed. With the solenoid valve 49 closed, inflow of air into the first chamber 45 is stopped irrespective of operation of the level adjustment device 52 and air flows out of a discharge pipe 46 through the throttle valve 47. Accordingly, the air pressure in the second chamber 43 connected through the orifice 44 decreases and the piston 40 is seated. In this state, the piston 40 is pressed against a bottom surface of the second chamber 43 due to weights of loads on the base 11 and thus the piston 40 cannot easily be moved. In particular, the robot 21 having a small size can be mounted in the configuration of the embodiment as described with reference to FIG. 1 and thus the base 11 having a weight of several hundred kilograms is not moved by the reactions to the robot 21 having the small size.

Figure 5A:
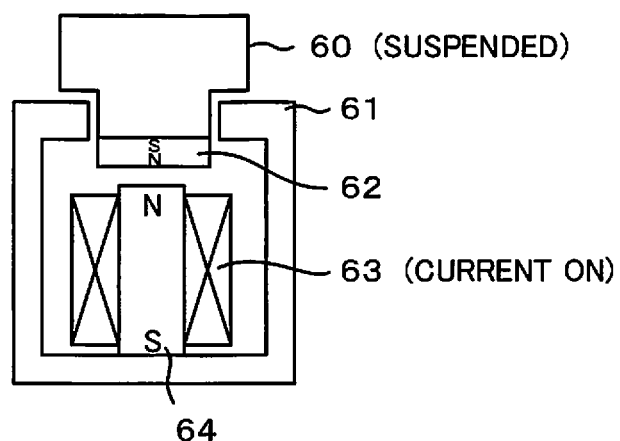
FIGS. 5A and 5B are diagrams illustrating a structure of a magnet damper for which suspension and seating can be controlled by external signals.
Figure 5B:
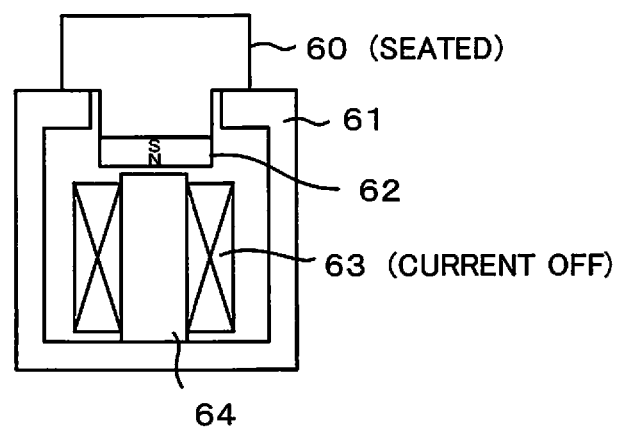

FIGS. 5A and 5B illustrate a structure (sections) of a magnetic damper for which suspension or seating can be controlled by external signals, as an embodiment encompassed by Claim 2. The magnetic damper suspends a piston 60 with use of a repulsive force between a magnetic force that is generated when a current is passed through a coil 63 and a permanent magnet 62. In FIG. 5A, the current is passed in a direction such that the repulsive force between north poles is generated. A vertical position of the piston 60 is determined in a position where a load of the piston 60 and the repulsive force are made equal, because the magnetic force sharply decreases with increase in distance, and the position is held without such a level sensor as provided for the air damper. The suspended position, however, lacks the reproducibility, because the position of the piston 60 is not strictly controlled as with the air damper. For instance, the suspended position is easily changed in accordance with changes in the weights or center of gravity of the loads on the base 11.

Though the magnetic damper can be configured with use of repulsive forces between permanent magnets as a principle, it is easier to use the coil (electromagnet) 63 of FIGS. 5A and 5B for purpose of turning ON/OFF the magnetic force at discretion in the embodiment. Based on the external signals, the piston 60 is suspended as in FIG. 5A, when the current required for the coil 63 is passed, or the piston 60 is seated as in FIG. 5B, when the current is shut off.

Figure 6:
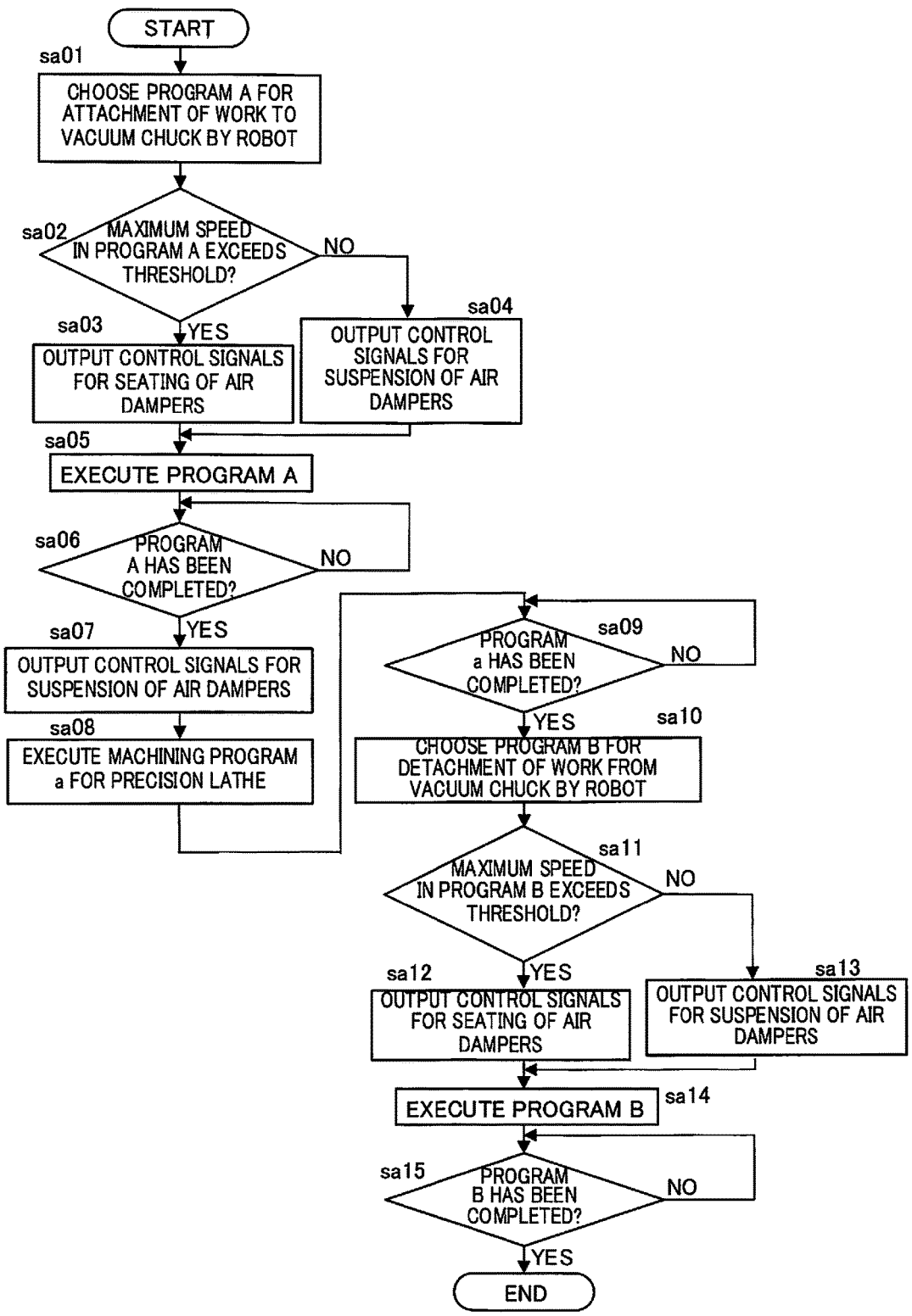
FIG. 6 is a flow chart illustrating operations of a robot, the positioning apparatus (precision lathe), and the vibration isolators (air dampers) in a configuration of FIG. 1.

FIG. 6 is a flow chart illustrating operations of the robot 21, the positioning apparatus (precision lathe), and the vibration isolators (air dampers) 10 in the configuration of FIG. 1, as an embodiment encompassed by Claim 3. An operation program for the robot 21 is chosen, maximum speed in the chosen program is compared with a predetermined threshold speed at timing before execution of the program, and the operation program for the robot 21 is executed in a state in which the air dampers are seated, if the maximum speed is higher than the threshold, or in a state in which the air dampers are suspended, if the maximum speed is equal to or lower than the threshold.

The speed of the robot 21 in operation is not fixed and thus real-time switching of the suspension/seating of the air dampers based on determination of only comparison in the speed of the robot 21 leads to frequent switching of the suspension/seating. In the air dampers, operating speed of the piston 40 is restricted as described with reference to FIG. 4 and thus instantaneous switching of the suspension/seating cannot be carried out. Accordingly, putting the robot 21 on standby during the switching leads to deterioration in the cycle time.

Therefore, maximum value of instruction speed in one program is taken notice of and comparison between the maximum value and the threshold of the instruction speed is carried out before the execution of the program. Such processing causes automatic determination of the suspension/seating of the vibration isolators before the execution of the program and maintenance of the determined state during the execution of the program and thus prevents the frequent switching of the suspension/seating.

Strictly, maximization in the instruction speed for the robot 21 does not always cause maximization in the reaction exerted on the base 11 and the maximization in the reaction depends on posture, setting of acceleration and deceleration, and the like of the robot 21. A speed, however, is often specified for each operation on a program for the robot 21 and it is therefore easy to automatically detect the maximum speed from the program. The speed of the robot 21 is sometimes specified for each axis but it is preferable to specify the speed at a position of the hand 22 (in tool coordinate system).

Hereinbelow, the flow chart of FIG. 6 will be described in accordance with steps therein.

[Step sa01] A program A for the attachment of a work to the vacuum chuck by the robot is chosen.

[Step sa02] Whether the maximum speed in the program A exceeds the threshold or not is determined and the flow transfers to step sa03 if the maximum speed exceeds the threshold (YES) or transfers to step sa04 if the maximum speed does not exceed the threshold (NO).

[Step sa03] Control signals for the seating of the air dampers are outputted.

[Step sa04] Control signals for the suspension of the air dampers are outputted.

[Step sa05] The program A is executed.

[Step sa06] Whether execution of the program A has been completed or not is determined and the flow transfers to step sa07 if the program A has been completed (YES) or completion is waited if the program A has not been completed (NO).

[Step sa07] Control signals for the suspension of the air dampers are outputted.

[Step sa08] A machining program a for the precision lathe is executed.
[Step sa09] Whether execution of the program a has been completed or not is determined and the flow transfers to step sa10 if the program a has been completed (YES) or completion is waited if the program a has not been completed (NO).
[Step sa10] A program B for the detachment of the work from the vacuum chuck by the robot is chosen.
[Step sa11] Whether the maximum speed in the program B exceeds the threshold or not is determined and the flow transfers to step sa12 if the maximum speed exceeds the threshold (YES) or transfers to step sa13 if the maximum speed does not exceed the threshold (NO).
[Step sa12] The control signals for the seating of the air dampers are outputted.
[Step sa13] The control signals for the suspension of the air dampers are outputted.
[Step sa14] The program B is executed.
[Step sa15] Whether the program B has been completed or not is determined and processing is ended if the program B has been completed (YES) or the processing is ended upon the completion if the program B has not been completed (NO).

Figure 7:
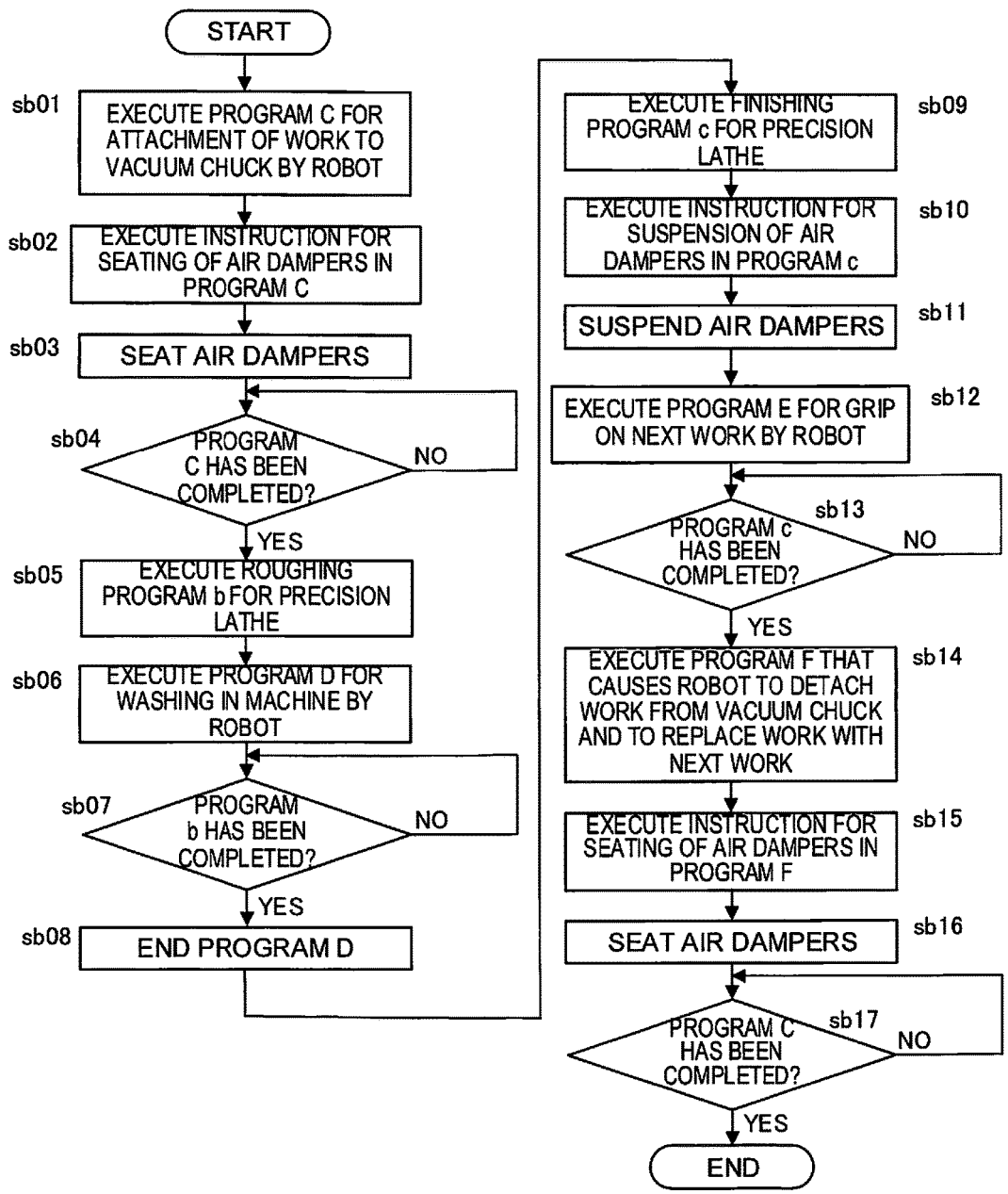
FIG. 7 is a flowchart illustrating operations of the robot, the positioning apparatus (precision lathe), and the vibration isolators (air dampers) in the configuration of FIG. 1.

FIG. 7 is a flowchart illustrating operations of the robot 21, the positioning apparatus (precision lathe), and the vibration isolators (air dampers) 10 in the configuration of FIG. 1, as an embodiment encompassed by Claim 4. The robot 21 has a function that allows replacement between a double hand illustrated in FIG. 8A and a washing hand illustrated in FIG. 8B.

In the flow chart of FIG. 6, the maximum instruction speed for the robot 21 is compared with the threshold and the control signals for the suspension/seating of the air dampers are outputted after the program for the robot 21 is chosen. In the machining system including the robot 21, however, which system is used for mass-production machining, the same program is iteratively used. Therefore, whether the air dampers are to be suspended or to be seated is often obvious from purposes of the program. That is, a statement for the suspension or seating of the air dampers can be integrated into the program when the program is prepared.

Among programs in the flow chart of FIG. 7, a program C (attachment of a work to the vacuum chuck), a program D (washing in the machine for washing chips produced in roughing), and a program F (detachment of the work from the vacuum chuck) in which the robot operates at high speed, and a roughing program b which does not require accuracy are executed in the state in which the dampers are seated. On the other hand, a finishing program c and a program E in which next work is prepared in finishing for the shortening of the cycle time are executed in the state in which the air dampers are suspended, in order to ensure an accuracy in the finishing. The control signals for the air dampers may be outputted from either of a controller for the precision lathe and the controller for the robot.

Though the switching to the suspension or the seating of the vibration isolators 10 is carried out based on the speed of the robot 21 in description referring to FIGS. 2, 3, and 6, strong reactions are actually caused when the axes of the positioning apparatus are driven at high speeds as well. Therefore, roughing is carried out with the air dampers seated in the flow chart of FIG. 7 in order to prevent shaking of the base that may be caused by the reactions to the acceleration and deceleration in the high-speed machining.

An operation of washing out the chips in the machine is carried out by the robot 21 in the roughing because a large quantity of chips are produced in the roughing and then the high-speed operation of the robot 21 can be attained because the vibration isolators are seated.

Hereinbelow, the flow chart of FIG. 7 will be described in accordance with steps therein.
[Step sb01] The program C for the attachment of a work to the vacuum chuck by the robot is executed.
[Step sb02] An instruction for the seating of the air dampers in the program C is executed.
[Step sb03] The air dampers are seated.
[Step sb04] Whether the program C has been completed or not is determined and the flow transfers to step sb05 if the program C has been completed (YES) or completion is waited if the program C has not been completed (NO).
[Step sb05] The roughing program b for the precision lathe is executed.
[Step sb06] The program D for the washing in the machine by the robot is executed.
[Step sb07] Whether execution of the program b has been completed or not is determined and the flow transfers to step sb08 if the program b has been completed (YES) or completion is waited if the program b has not been completed (NO).
[Step sb08] Execution of the program D is ended.
[Step sb09] The finishing program c for the precision lathe is executed.
[Step sb10] An instruction for the suspension of the air dampers in the program c is executed.
[Step sb11] The air dampers are suspended.
[Step sb12] The program E for a grip on next work by the robot is executed.
[Step sb13] Whether the program c has been completed or not is determined and the flow transfers to step sb14 if the program c has been completed (YES) or completion is waited if the program c has not been completed (NO).
[Step sb14] The program F that causes the robot to detach a work from the vacuum chuck and to replace the work with the next work is executed.
[Step sb15] An instruction for the seating of the air dampers in the program F is executed.
[Step sb16] The air dampers are seated.
[Step sb17] Whether execution of the program C has been completed or not is determined and processing is ended if the program C has been completed (YES) or the processing is ended upon the completion if the program C has not been completed (NO).

Figure 8A:
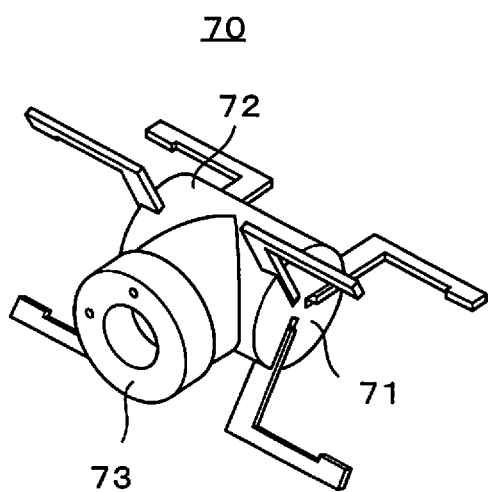
FIGS. 8A and 8B are diagrams illustrating hands the robot uses in machining of the flow chart illustrated in FIG. 7.
Figure 8B:
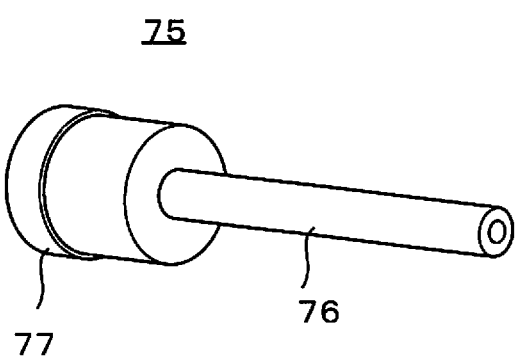

FIGS. 8A and 8B are diagrams illustrating the hands the robot uses in the machining of the flow chart illustrated in FIG. 7.

FIG. 8A illustrates the double hand 70 that is capable of simultaneously gripping two works and that grips the work 18 by independently opening and closing two three-jaw air chucks 71 and 72. Thus the machined work 18 can be detached from the vacuum chuck 17 while the unmachined work 18 is gripped and then the unmachined work 18 can be attached to the vacuum chuck 17 without interruption. As a result, the shortening in the cycle time for the work replacement is facilitated. FIG. 8B illustrates the washing hand 75, which washes out the chips by jetting out high-pressure wash fluid from a wash nozzle 76. The hands, that is, the double hand 70 and the washing hand 75 are mounted with hand replacement mechanisms 73 and 77, respectively, in basal parts thereof and each can be attached to and detached from a wrist of the robot 21. Thus automatic replacement of the hand with use of the robot 21 can be carried out.

Figure 9A:
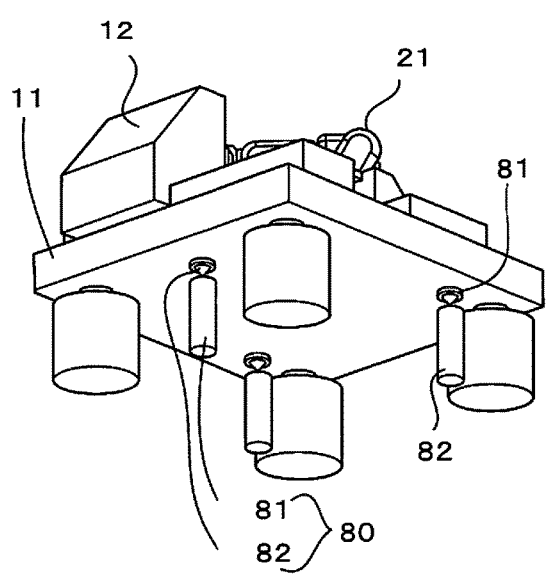
FIGS. 9A, 9B, and 9C are diagrams illustrating protruded and recessed joint members.
Figures 9B, 9C:
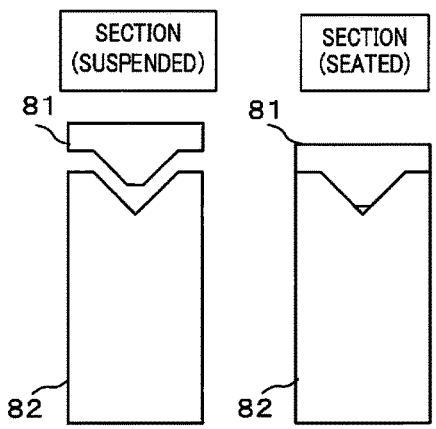
Figure 11:
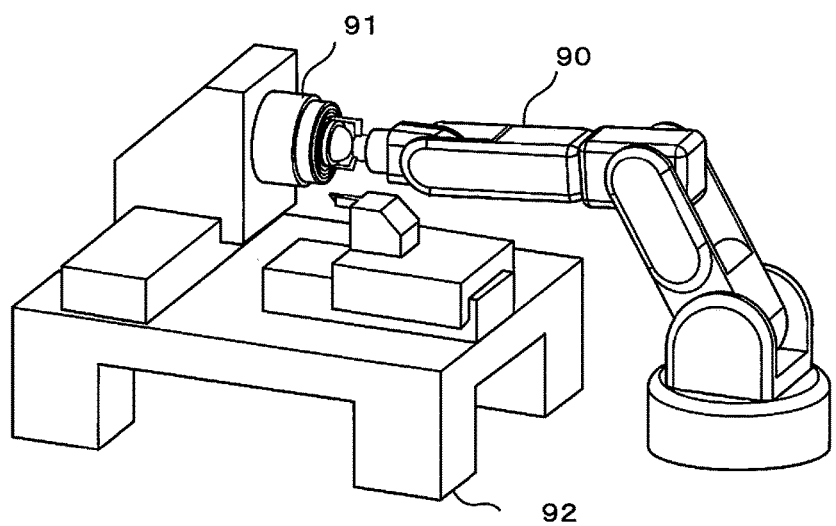
FIG. 11 is a diagram illustrating a prior art technique.

FIGS. 9A to 9C are diagrams illustrating protruded and recessed joint members. FIGS. 9A to 9C illustrate an embodiment that is encompassed by Claim 5. There are three sets of protruded and recessed joint components 80 having conical shapes. In the protruded and recessed joint components 80, a protruded joint component 81 is fixed to a side of the base 11 and a recessed joint component 82 is fixed to a side of the floor 30. A gap is produced between conical parts thereof, when the vibration isolators 10 are suspended, or the protruded and recessed conical parts are jointed so as to be put into a three-point supported state, when the vibration isolators 10 are seated. Therefore, the position of the base 11 relative to a surface of the floor 30 is accurately reproduced in the seated state. The joint members may be built in the vibration isolators 10.

Figure 10A:
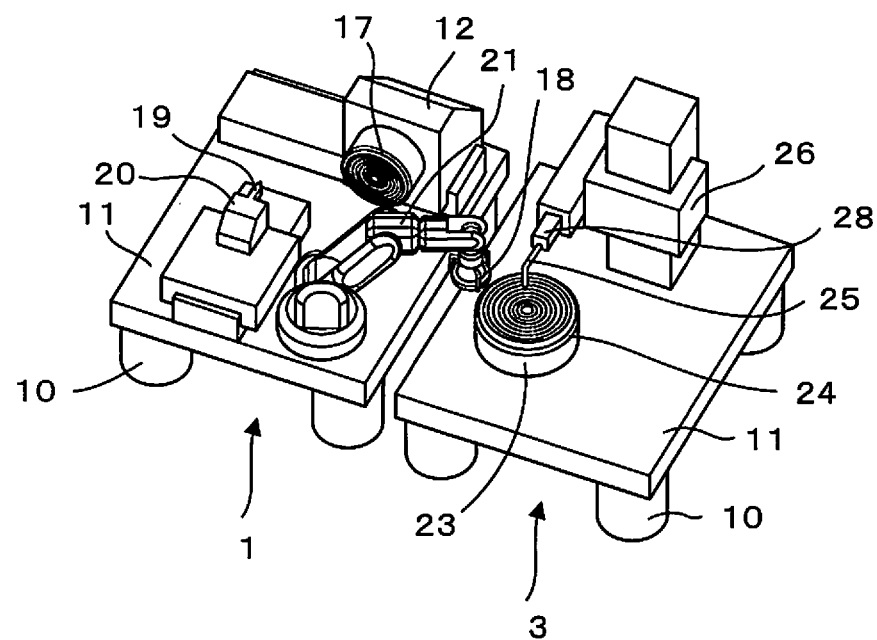
FIGS. 10A and 10B are diagrams illustrating a system in which the precision three-dimensional measurement apparatus (mounted with no robot) of FIG. 3 is installed next to the precision lathe of FIG. 1 and in which a work machined on the precision lathe is handled by the robot onto a rotary table (vacuum chuck) of the precision three-dimensional measurement apparatus.
Figure 10B:
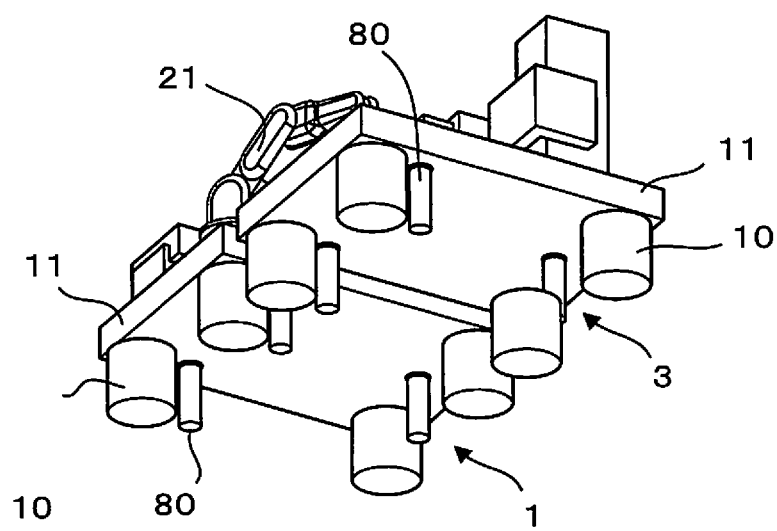
Figure 12:
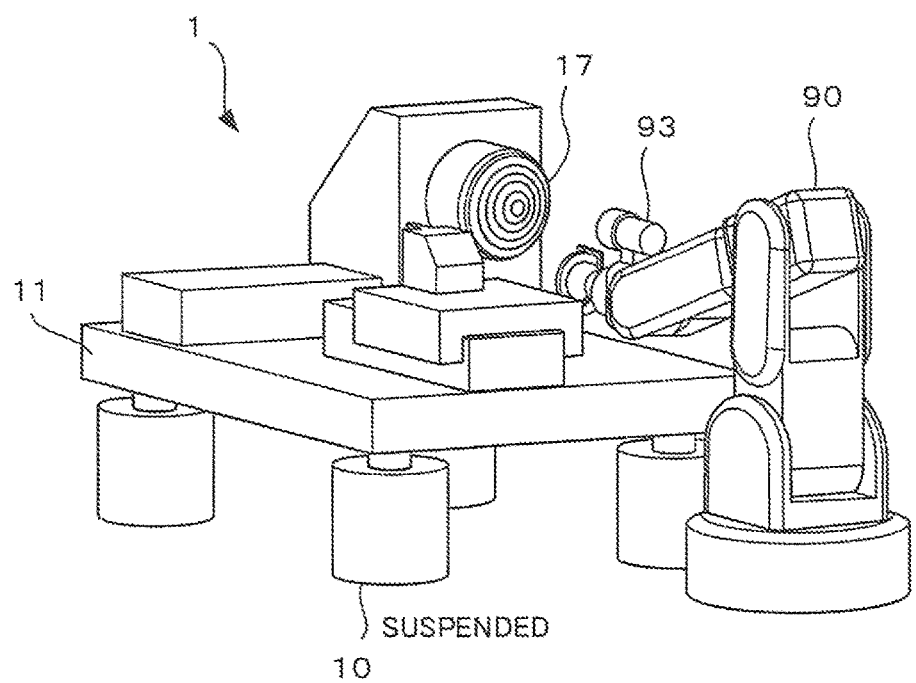
FIG. 12 is a diagram illustrating a prior art technique.

FIGS. 10A and 10B illustrate an embodiment that is encompassed by Claim 5. FIG. 10A is a view as seen looking diagonally from above and FIG. 10B is a view as seen looking diagonally from below. In this system, the precision three-dimensional measurement apparatus 3 (mounted with no robot) of FIG. 3 is installed next to the precision lathe of FIG. 1 and a work machined on the precision lathe 1 is handled by the robot 21 onto the rotary table (vacuum chuck) of the precision three-dimensional measurement apparatus 3. When the work is conveyed between both apparatuses, the vibration isolators 10 of the apparatuses are seated and the protruded and recessed joint components 80 of FIG. 9 provided on the apparatuses are jointed, so that the positions of the bases 11 of the apparatuses are accurately fixed. In this state, relative position between the robot on the precision lathe 1 and the rotary table (vacuum chuck) on the precision three-dimensional measurement apparatus 3 does not deviate and thus the work can be placed in an accurate position.

The invention claimed is:

1. A positioning apparatus mounted with at least one linear axis or axis of rotation and a robot on a base, the positioning apparatus comprising:
    vibration isolators configured to seat and suspend the base; and
    a level adjustment device provided between the base and the vibration isolators, wherein
    during a series of operations of the robot that are delimited by at least one program, each operation in the series of operations sets an instruction speed of the operation of the robot,
    the level adjustment device is configured to control suspension and seating of the vibration isolators with respect to the base in accordance with a result of comparison between the highest instruction speed in the series of operations of the robot and a predetermined speed,
    the vibration isolators are configured to effect a state of the suspension or the seating before the program is executed, and maintain the state during the execution of the program,
    the level adjustment device is further configured to control the vibration isolators to be seated when the robot is operated at the highest instruction speed to replace a work or a tool on a machine tool or a measurement apparatus, and
    the level adjustment device is further configured to control the vibration isolators to be suspended when machining or measurement operated by the robot at a speed less than the highest instruction speed is started.

2. The positioning apparatus according to claim 1, wherein the vibration isolators have a structure that is suspended with pneumatic pressure or electromagnetic force.

3. The positioning apparatus according to claim 1, wherein the level adjustment device is configured to control the suspension or the seating of the vibration isolators in accordance with control signals outputted at timing specified in the at least one program.

4. The positioning apparatus according to claim 1, further comprising:
    at least one set of joint members configured to uniquely determine a position and a posture of the base when the vibration isolators are seated.

5. The positioning apparatus according to claim 1, wherein a control instruction for the vibration isolators is integrated into
    a first program for a machine tool or a measurement apparatus,
    a second program for the robot, or
    both the first and second programs.

* * * * *